US005590768A

United States Patent [19]
Hilton et al.

[11] Patent Number: 5,590,768
[45] Date of Patent: Jan. 7, 1997

[54] STORAGE CASE FOR DISK-SHAPED MEDIA HAVING A BI-STABLE EJECTION MECHANISM UTILIZING COMPLIANT DEVICE TECHNOLOGY

[75] Inventors: Lance Hilton, Provo; Vicki S. Beal, Murray, both of Utah

[73] Assignee: Compliant Solutions, LC, American Fork, Utah

[21] Appl. No.: 585,783

[22] Filed: Jan. 11, 1996

[51] Int. Cl.$^6$ ................................................. B65D 85/57
[52] U.S. Cl. .................... 206/308.1; 206/310; 312/9.48; 312/9.64
[58] Field of Search ........................... 206/303, 307–313, 206/307.1, 308.1, 308.2, 308.3, 387.12; 312/9.9, 9.16, 9.17, 9.19, 9.26, 9.47, 9.48, 9.57, 9.63, 9.64

[56] References Cited

U.S. PATENT DOCUMENTS

| | | | |
|---|---|---|---|
| 4,535,888 | 8/1985 | Nusselder | 206/444 |
| 4,702,533 | 10/1987 | Seifert | 206/308.1 |
| 4,705,166 | 11/1987 | Ackeret | 206/309 |
| 4,722,439 | 2/1988 | Grobecker et al. | 206/309 |
| 4,805,770 | 2/1989 | Grobecker et al. | 206/309 |
| 4,807,749 | 2/1989 | Ackeret | 206/387 |
| 4,905,217 | 2/1990 | King et al. | 369/291 |
| 5,086,923 | 2/1992 | King et al. | 206/444 |
| 5,191,983 | 3/1993 | Hardy | 211/40 |
| 5,249,677 | 10/1993 | Lim | 206/310 |
| 5,253,751 | 10/1993 | Wipper | 206/45 |
| 5,265,721 | 11/1993 | Castritis | 206/309 |
| 5,284,248 | 2/1994 | Dunker | 206/444 |
| 5,360,106 | 11/1994 | Nakayama et al. | 206/309 |
| 5,360,107 | 11/1994 | Chasin et al. | 206/313 |
| 5,366,073 | 11/1994 | Turrentine et al. | 206/309 |

FOREIGN PATENT DOCUMENTS

| | | | |
|---|---|---|---|
| 320674 | 10/1929 | United Kingdom | 312/9.26 |
| 87/05884 | 10/1987 | WIPO | 312/9.47 |

*Primary Examiner*—Jimmy G. Foster
*Attorney, Agent, or Firm*—Workman, Nydegger & Seeley

[57] ABSTRACT

A compact disk storage case having a positioning mechanism to eject or retract a compact disk. The compact disk storage container completely encloses the compact disk when in the retracted position and allows an appreciable amount of the disk to be available for easy removal of the compact disk when in the extended position. An ejection or positioning mechanism utilizing a bi-stable movement assembly based on compliant device technology is further provided. Two flexible and resilient members have fixed ends that are anchored on opposite sides of the housing of the compact disk storage container and moving ends that are pivotally connected to each other. The bi-stable movement assembly also has a means for holding the compact disk attached thereto and by utilizing the disclosed compliant mechanisms, the entire ejection mechanism can be injection molded as a single piece. The bi-stable movement assembly has two stable positions, one corresponding to an extended position, the other to a retracted position. Further, there is a means for actuating the ejection process that pushes the bi-stable movement assembly into an unstable region until a transition point is crossed wherein the bi-stable movement assembly will tend towards the opposite position. Retraction of the compact disk is accomplished by placing the CD into the compact disk holding means and pushing towards or into the case. Again, once the transition point is crossed, the bi-stable movement assembly will automatically draw the compact disk into the retracted position using the stored energy caused by pushing the bi-stable movement assembly into the unstable region. Further, a single piece injection molded article of manufacture having the ejection or positioning mechanism incorporated therein is disclosed. Such an article connects the ejection or positioning mechanism, a top housing portion, and a bottom housing portion by hinge means so the article of manufacture may be folded into an operating compact disk storage case according to the present invention.

37 Claims, 7 Drawing Sheets

STORAGE CASE FOR DISK-SHAPED MEDIA HAVING A BI-STABLE EJECTION MECHANISM UTILIZING COMPLIANT DEVICE TECHNOLOGY

BACKGROUND OF THE INVENTION

1. The Field of the Invention

The field for this invention is in the area of storage containers and ejection mechanisms for disk-shaped media. More particularly, this invention relates to storage cases and ejection mechanisms for the compact disk ("CD") format commonly used as media for music and computer software.

2. Present State of the Art

There currently exists a number of different containers for holding and storing compact disks. The most common case, known as a jewel box case, consists primarily of a hinged box having a tray therein for placement of the compact disk. The tray has a center spindle with fingers to suspend the compact disk above the tray and away from the surfaces of the box to protect the compact disk from abrasion when transporting the case.

The jewel box case is best adapted for manufacture by separately injection molding the three constituent pieces (top cover, bottom box, and disk tray) and then using automated assembly machinery known in the art to assemble the three pieces along with any informational or promotional materials such as a lyric booklet that may be part of the final commercial package. During the assembly process, the disk-shaped media is also placed within the tray and the entire package is shrink-wrapped and easily made ready for retail display.

The jewel box case suffers from a number of significant disadvantages that make it somewhat inconvenient to use. For instance, the hinged cover must be opened in order to remove or replace the compact disk. The securement means used in the jewel box case to secure the cover in place with respect to the bottom box can be difficult to loosen, particularly with a single hand. Furthermore, once the jewel box case is opened, it is sometimes awkward to remove the compact disk from the center spindle that exerts force on the inner hole of the compact disk to suspend away from other case surfaces. Another problem with the conventional jewel box case is the potential for easy breakage due to the materials used in construction. The jewel box cases are usually made of polystyrene plastics that are relatively brittle making them susceptible to cracking when exposed to cold temperatures or breaking when dropped or subject to other shock forces.

The hinge design of the jewel box case typically requires two hands to gain access to the disk inside. While this normally does not present additional problems other than the inconvenience mentioned above, there are some situations that would benefit advantageously from a compact disk container that can allow access to the compact disk with one hand. For instance, an operator of a motor vehicle wanting to change music CDs while driving would be able to do so in a much safer manner if only one hand were removed from the steering wheel.

What is needed is a compact disk storage case that allows more convenient access to the stored disk-shaped media contained therein than the current hinged-box design commonly found. Ideally, such access to the compact disk is achievable through use of a single hand.

Furthermore, an inexpensive and convenient ejection mechanism that easily places a compact disk into and out of a storage container would be viewed favorably as a convenient feature. Such a feature would not only exhibit handy functionality but would also distinguish the case from those made by competitors. Additionally, while some forms of ejection mechanisms exist today, they are typically bulky, relatively complex, and expensive to manufacture when applied to retail storage cases to package music CDs, software CD-ROMs and other disk-shaped media products sold by mass distribution.

Furthermore, existing ejection mechanisms utilize compressed springs and other mechanical energy storage devices. Typically, a spring is compressed upon placing the compact disk into a storage container and the user ejects the compact disk by causing the compressed spring to extend outward thereby propelling a tray or other compact disk holding arrangement that puts the compact disk itself outside of the confines of the storage container thereby making the compact disk accessible. Besides the complexity of such an arrangement, fatigue and wear are common requiring the use of more expensive materials, making construction of the device prohibitively costly when using high quality components to achieve the required utility.

One problem encountered with mechanical energy storage devices occurs when storing a compact disk for a long period of time. During long-term storage the spring or other energy storage device may loose its compression ability entirely. Though metal components may be used to heighten ejection mechanism life, this entails additional cost of more expensive components and more complex assembly.

Another disadvantage of compressed energy type devices is that in some implementations, the compact disk itself may bear the force of the compression. When this is the case, warping and other damage to the compact disk is possible thereby reducing or destroying the compact disk for its intended purpose.

Though compressed energy devices used with a sliding tray or other carrier to hold the compact disk are effective for many implementations, such configurations are not usually cost effective for retail packaging of music CDs, computer software on CD-ROMs, and other mass distributions of disk-shaped media. One usually finds compressed energy devices used in conjunction with trays on low-end CD-ROM drives or applications where the unit 21 cost of the finished product can support the added cost entailed by utilizing a relatively 22 complex and expensive ejection mechanism assembly.

What is needed is an ejection mechanism that will not use compressed energy devices where compression is long-term, yet still provide ejection of a carrier or other holding means having a compact disk placed therein. Such an ejection mechanism needs to be inexpensive to manufacture and easy to assemble as part of a case used for retail packaging and permanent storage of a compact disk. It would be advantageous in many circumstances to design such a case so that it may be integrated in existing assembly machinery to provide easier market integration. It would be of further benefit if such a case could be operated so as to give convenient one-handed access to a compact disk.

SUMMARY AND OBJECTS OF THE INVENTION

It is an object of the invention to allow a user to quickly and easily remove or replace compact disk or other media into or out of a storage case or with respect to some other housing.

It is a further object of this invention to provide an ejection mechanism for disk-shaped media that utilizes compliant device technology and is cost-effective to implement in a retail compact disk case designed for mass distribution of the media.

It is a feature of this invention that the CD holder used in conjunction therewith need not extend beyond the confines of a compact disk container when making the compact disk available for removal or awaiting placement of a compact disk.

It is another object of the invention to provide a CD case having ejection mechanism that is adaptable to a single piece ejection-molded design.

It is yet another object of this invention to hold disk-shaped media in a protective case where the relevant media surface is completely suspended and has no contact with any case surface in order to prevent abrasive damage to the relevant media surface during shipping and case movement.

It is of added benefit and an object of the invention to prevent abrasion damage to a disk-shaped media while the disk is being ejected or retracted into a storage container, including the actual removal of the media once in the extended position after ejection.

It is another object of the invention to allow convenient one-handed ejection of a compact disk within a completely enclosing case.

It is an advantage of this invention that the ejection mechanism here presented for use with disk-shaped media does not store energy for long periods of time as do spring-based ejection mechanisms.

It is another object of this invention to generate a compact disk case for retail use and permanent storage that has an ejection mechanism at about the same cost as existing compact disk cases.

It is yet a further object of this invention as implemented in a compact disk case to allow existing assembly machinery used to assemble the typical CD jewel box case to assemble the new and improved compact disk case with only minor modifications.

Additional objects and advantages of the invention will be set forth in the description which follows, and in part will be obvious from the description, or may be learned by the practice of the invention. The objects and advantages of the invention maybe realized and obtained by means of the instruments and combinations particularly pointed out in the appended claims.

To achieve the foregoing objects, and in accordance with the invention as embodied and broadly described herein an ejection mechanism for disk-shaped media implemented as part of a storage container for disk-shaped media is provided. Specifically, a compact disk case is disclosed to illustrate the invention.

The compact disk storage container of the present invention utilizes compliant device technology as part of an ejection mechanism that does not store mechanical energy for extended periods of time. This is contrasted from currently known ejection mechanisms which in many cases store mechanical energy through compression springs or other tensioned elements for long periods of time until the compact disk is to be ejected. This is particularly true for storage cases where the time stored typically far exceeds the time the media would actually be out of the case for use. Compliant device technology provides an inexpensive way to manufacture relatively complex mechanical designs that would be otherwise cost prohibitive, especially where low unit cost is crucial to the success of the product as is mass distributed storage containers for most music CDs and computer software CD-ROMs.

Compliant device technology operationally simulates conventional mechanical elements but does so with a reduced overall complexity by careful selection of materials, novel designs, and manufacturing techniques. For example, a conventional pivot point may require up to four different and discrete components: the two pieces that will pivot relative to one another, a pin for them to pivot around, and a clip or other means to retain the pin in position with respect to the pivoting pieces. Alternatively, a pivoting connection may be injection molded along with the pivoting parts in a single article of manufacture that accomplishes the same purpose and operates in the same manner. By choosing the pivot design and materials properly, the need to assemble the parts has been eliminated as well as the logistics of maintaining separate replacement parts. Such advantages open a wealth of efficiencies to be exploited in the realm of ejection mechanisms for disk-shaped media and other applications.

This represents a great advantage since inexpensive components may be used to construct the simplified ejection mechanism. The bi-stable compliant device combination making up the bi-stable movement assembly of the ejection mechanism is capable of stable equilibrium in only two positions. In any other position along its path of movement, the movement assembly will drive itself to one of the stable positions. One of the two stable positions corresponds to a retracted position for storing a compact disk within the case and the other corresponds to an extended position that allows a user to remove or place the compact disk onto the compact disk holding means.

When the bi-stable movement assembly is in the unstable region, it will exert force to drive the assembly to one of the stable positions. Though no energy is stored at either stable position, energy is stored once urged into the unstable region and originates in the user either pushing an ejection slide or pushing the compact disk into the case. At a certain transition point, the stable position sought by the movement assembly will change causing the actual operation of ejection mechanism.

The main body of the container is a structural housing that makes up the body of the container is provided to totally enclose and store the compact disk. The housing is formed so that it has an entrance/exit opening in order to access the disk for removal or place the disk into the case for storage and provides the anchor point for the bi-stable movement assembly that is the operative focus of the ejection mechanism.

To operate the storage container, the user simply inserts the disk into the holding means that is available through the entrance/exit slot and gently pushes the compact disk towards the rear of the storage case. There will be a slight initial resistance as the ejection mechanism, the heart of which is a bi-stable compliant device movement assembly, stores energy as it is being moved into the unstable region. This resistance will continue until the transition point is crossed at which time the bi-stable compliant device movement assembly will use the stored energy from the user pushing the compact disk into the case to draw the compact disk to its final resting position for storage. At that point, the compact disk will be entirely within the storage case.

In order to eject a compact disk from the storage case, a user will operate a slide knob that in turn moves an actuating means against the bi-stable movement assembly. Again, there is initial resistance as the bi-stable movement assembly stores energy while being driven into the unstable region since the natural tendency is to drive the compact disk back to its stored or retracted position. Once the critical threshold is reached and the transition point crossed, the bi-stable movement assembly will move to the stable extended position automatically using the energy stored during movement of the slide knob. When in the extended position no energy is stored and a substantial portion of the compact disk is accessible outside the storage case through the entrance/exit opening. At this point, a user may simply grasp the compact disk for use or, if the case is empty, replace a compact disk into the holding means for insertion into the case.

When the bi-stable movement assembly is in the stable retracted position, the components are completely relaxed. This is in sharp contrast with spring activated or energy storage devices where energy remains compressed while in a retracted state in order to eject to the extended state. Because the majority of the container's useful life will be spent in the stable states, less stress is placed on the ejection mechanism thereby allowing inexpensive materials and forms of manufacture that allows this form of ejection mechanism to be mass produced in compact disk cases at comparable cost to existing cases.

The bi-stable movement assembly is comprised of two flexible and resilient members that are pivotally connected to the side of the storage case housing as well as being pivotally connected to each other. Each flexible and resilient member is curved to fit the outside contours of a compact disk. When the compact disk is retracted into the storage case, the two pivotally connected flexible and resilient members will encircle the edges in a semicircular shape. The members are flexible so as to provide movement and the ability to store energy. Energy storage occurs when the shape of the flexible and resilient member is compressed and the resilient nature of the member will tend to drive the member to its resting or noncompressed state.

By encircling the outer edges of the compact disk, the two pivotally connected flexible and resilient members are stored in the same plane as the compact disk itself thereby keeping the overall form factor of the storage case as thin as possible. Other embodiments can be imagined where the flexible and resilient members are on a different plane than the compact disk thereby making the overall storage case thicker.

The amount of movement the bi-stable movement assembly will traverse is dependent upon the length of the flexible and resilient pivotally connected members and the positioning of the anchor pivots. The distance between the anchor pivots of the flexible and resilient member forms a line where the pivotally connected ends will cross between the two stable positions. This line also represents a critical point, the transition point, where the direction that the movement assembly will urge the pivotally connected ends changes to that opposite of the original direction.

In one stable location, the pivotally connected ends will be a given distance from this line representing the transition point. The total amount of traversed areas will be two times this given distance as the other position will be located the same distance but on the other side of the line between the anchor points representing the transition point. This arrangement allows considerable design flexibility according to the present invention for arriving at the desired amount of travel between the two stable positions of the bi-stable movement assembly.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Throughout this patent application, the present invention is explained through the preferred embodiment of a compact disk storage case wherein the case is designed for mass production and permanent storage or retail sale of the compact disk media as found in music CDs and CD-Rom software. It would be apparent to those skilled in the art that principles related to the invention will allow its use with any disk-shaped media requiring some form of storage. Furthermore, the invention may be incorporated in other applications and embodiments where movement of a compact disk between two positions with respect to a fixed housing is desired. Therefore, the terms case and container are used synonymously throughout the application as an object whose purpose is to hold and store a compact disk or other disk-shaped media while the term housing is more general and refers not only to the outer componentry of a case but also all applications of the present invention that move a compact disk between two points with respect to a fixed external structure.

A pivot as used throughout this application in reference to connecting flexible and resilient members to each other and to anchor points on some form of housing refer to both small length flexural pivots used throughout this application and the more conventional ordinary pin joint found in a variety of mechanical applications that functions equivalently to a small length flexural pivot. Throughout this application, however, a small length flexural pivot is usually formed during the manufacturing process as an actual integral part of the two portions that pivot together with the two portions and pivot being a single article. While there is only one actual piece, there are two parts thereof that functionally pivot with respect to one another and operate as if an actual mechanical pin joint joined them together. In essence, a small length flexural pivot is an innovative replacement of the mechanical pin joint. Furthermore, pivotally connected refers to the type of connection and may be comprised of a plurality of pivot joints to accomplish that purpose.

An ejection mechanism as used throughout this application refers to the workings that will automatically place disk-shaped media from a position where the media is inaccessible being enclosed within a case or housing to a position that places the disk-shaped media where it is accessible for removal. This term is interpreted broadly so that the reverse operation, automatically bringing a disk within the confines of the housing and therefore inaccessible for removal, is also contemplated. This opposite nature may use the same facilities as ejecting the CD but in a different direction in order to draw the CD within a housing.

Figure 1:
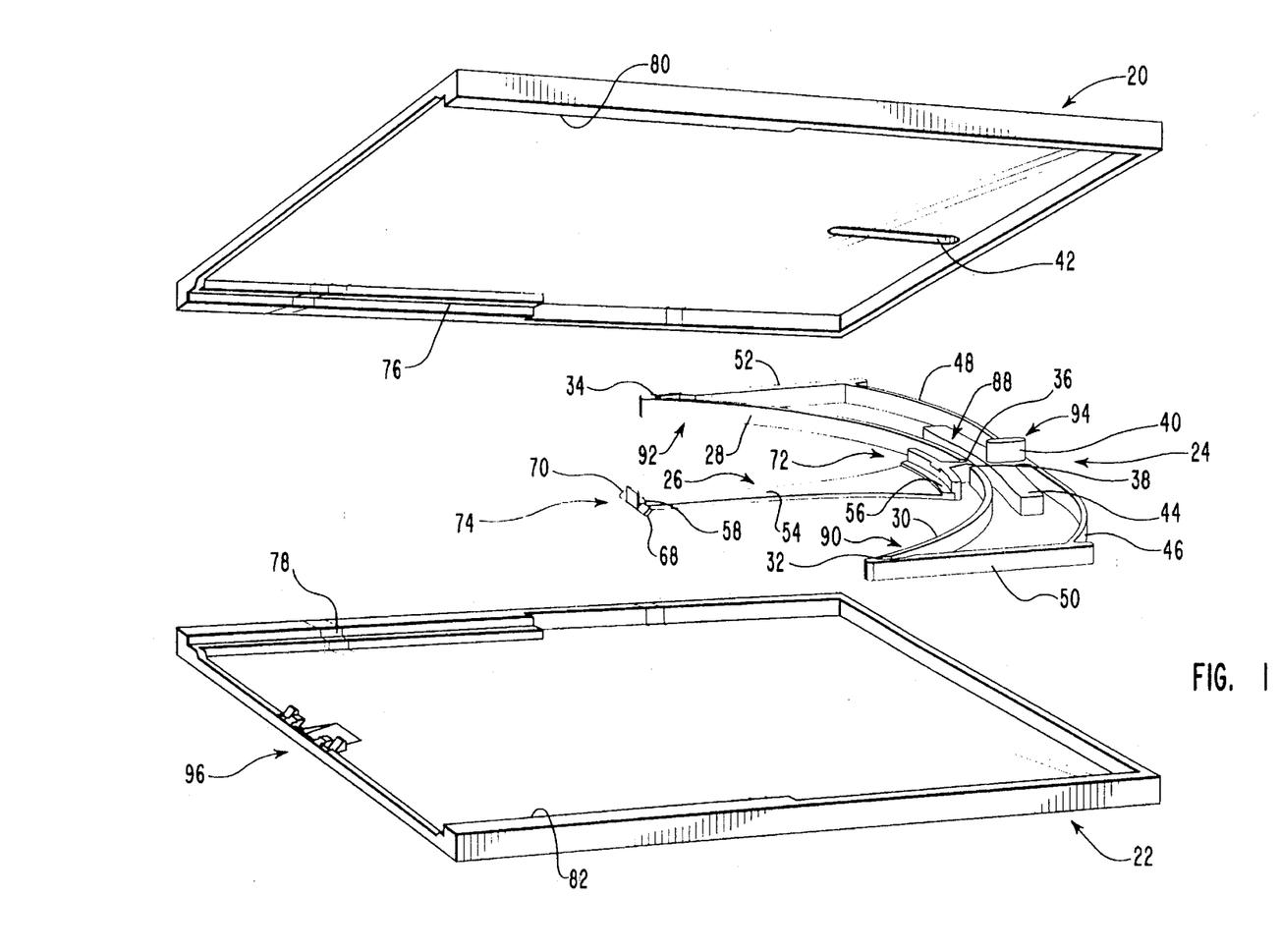
FIG. 1 is an exploded perspective view of a compact disk case suitable for music CDs, computer software CD-ROMs, or other disk-shaped media showing an ejection mechanism having a bi-stable movement assembly sandwiched between upper and lower housings.

Referring now to FIG. 1 the improved compact disk case of the present invention is shown in exploded and perspective view. An upper housing piece 20 is connected and secured to a lower housing piece 22 to form the body of the case with an ejection mechanism 24 having a bi-stable movement assembly and enclosed there between. The ejection mechanism 24 also has a CD holder 26 wherein an ordinary compact disk will be held.

The upper housing piece 20 and the lower housing piece 22 comprise the external boundaries of the compacted disk case and may be made of materials and in ways that are conventional in the art. Conventional clear polystyrene can be used to allow viewing to the inside of the case or promotional literature and other print media. To that end, at least one of the upper housing piece 20 or the lower housing piece 22 may have clips or other devices for holding such print media. Furthermore, the upper housing piece 20 and lower housing 22 may be constructed of less expensive materials such as polypropylene or others that provide manufacturing ease and advantages.

Figure 4:
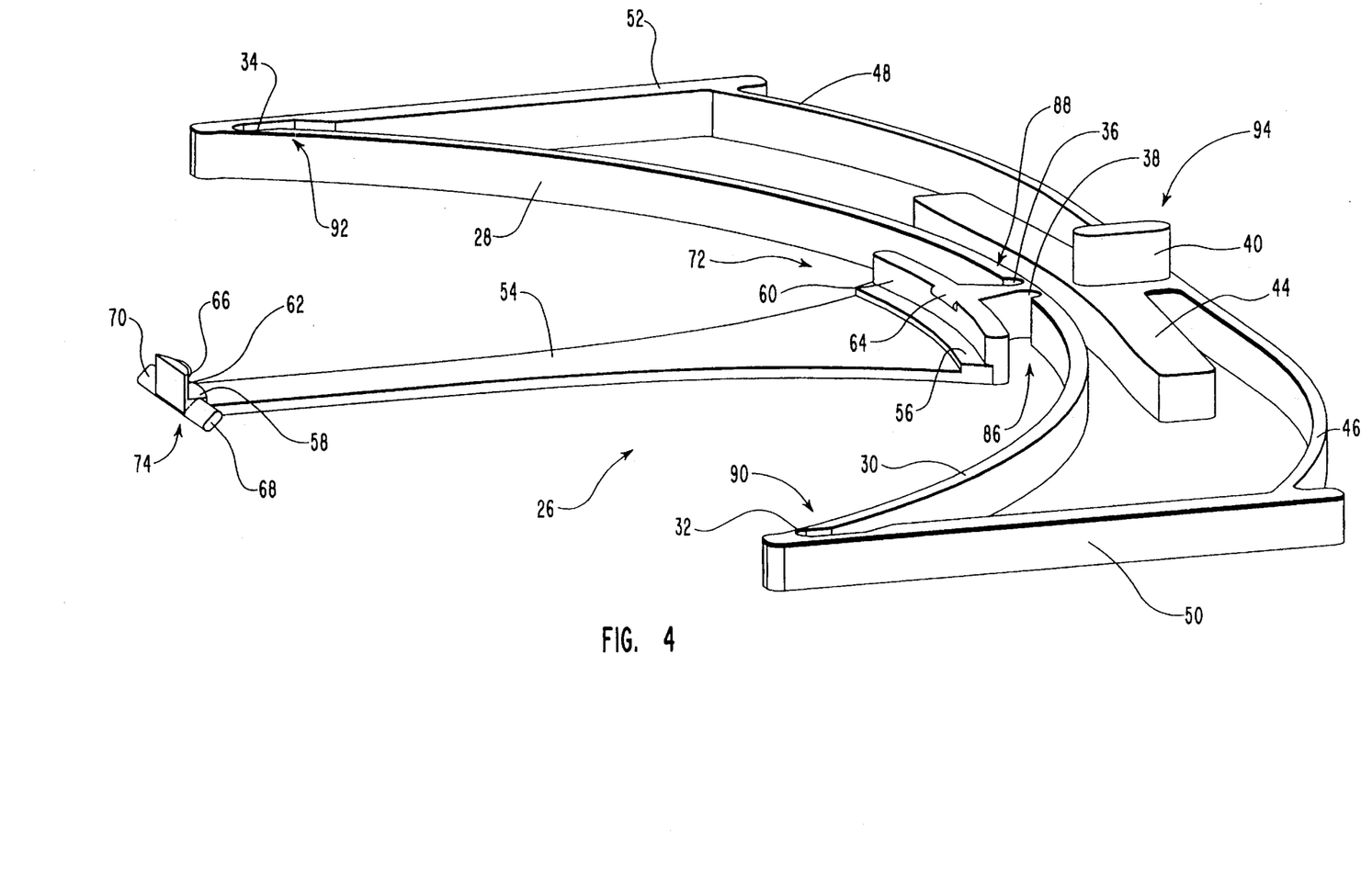
FIG. 4 is a closeup perspective view of the ejection mechanism shown in FIG. 1 providing added detail.

Turning now to FIG. 4, which illustrates the ejection mechanism 24 having a bi-stable movement assembly in greater detail, the constituent parts and their inter connectively activity will be illustrated. The CD holder 26 portion of the ejection mechanism 24 is composed of an elongated portion 54 having a distal end 74 and a base end 72. The elongated portion 54 roughly spans the radius of an ordinary compact disk and allows the compact disk to be grasped primarily by its sides between the distal end 74 and the base end 72 and at no other location.

It may be noted that a circular tray, encompassing the entire compact disk, may replace the CD holder 26 as well as would a clip grasping solely the edge of a compact disk. There exist many ways currently known in the an for holding disk-shaped media and those skilled in the art will undoubtedly see the usefulness of these differing configurations depending on specific application. All such variations comprise means for holding a compact disk and are equally useful for use with respect to the present invention dependent upon specific application.

The purpose of the CD holder 26 is to provide a means for holding the disk relative to the case housing comprised of upper housing piece 20 and lower housing piece 22. The CD holder 26 will also move with respect to the case housing such that the compact disk either will be enclosed within the case or it will be exposed to sufficient degree that a person may remove the compact disk for use or place a compact disk into the CD holder 26 for storage if empty. The CD holder 26 does not extend beyond the confines of the compact disk case even when in the extended position. This prevents damage to the CD holder since it is always internal to the case and cannot be accidentally broken.

On the distal end 74 of the CD holder 26 there exist distal end release protuberances 70 and 68 that fit within release catch 96. Release protuberances 68 and 70 are grasped by release catch 96 in such a manner that the retention clip 66 is pulled down and away from the compact disk to allow the disk to be easily removed from CD holder 26 when the bi<stable movement assembly is in the extended position. Not only is removal facilitated, but damage to the media surface is lessened because the compact disk can be removed without dragging the media surface across any part of the distal end 74 of the CD holder 26. The operation of the release mechanism will be explained and illustrated in more detail hereafter.

The CD holder 26 is preferred over other means for holding a compact disk and has a number of features that are designed to protect a compact disk from damage while in the case during storage or while being ejected from the case. Protective steps 56 and 58 allow the compact disk to rest within the CD holder 26 on the compact disk edges rather than have the media surface rub against the main body of elongated portion 54 or other surfaces. In this manner, the majority of the surface area of useable media is completely suspended from contact with the compact disk case. Retention clips 64 and 66 retain the compact disk securely within the CD holder 26 thereby further preventing any contact of the relevant media surface with the components of the compact disk case.

Another mechanism to protect the compacted disk media surface is shown in FIG. 1. The upper housing piece 20 has channel steps 76 and 80 while the lower housing piece 22 has corresponding channel steps 78 and 82. When the upper housing 20 is mated with the lower housing 22, channel steps 76 and 78 form a side channel while channel steps 80 and 82 form another side channel. A compact disk will be suspended by its edges within these two side channels, again keeping the media surface suspended within the compact disk container. Being thus suspended, the compact disk will not receive abrasion damage under normal operation.

Referring back to FIG. 4, the bi-stable movement assembly comprising flexible and resilient members 28 and 30 where the CD holder 26 is functionally attached is now described. Flexible and resilient members 28 and 30 have a natural shape associated with them that traces the curvature of a compact disk. Members 28 and 30 are resilient in that they will tend to their natural shape whenever bent or distended and they are flexible in that they may be bent or otherwise distended. When the resilient and flexible members 28 and 30 are in fact bent or distended, energy is stored therein and tends to push the respective member 28 or 30 to its natural or relaxed condition.

Though it may be noted that the compliant flexible and resilient members 28 and 30 are of equivalent size and shape as shown in FIG. 4, this need not necessarily be the case. A variety of compliant configurations could achieve the same purposes as shown by the arrangement herein disclosed.

The bi-stable movement assembly is formed by attaching flexible and resilient member 28 to the ejection mechanism side 52 by means of anchor pivot 34 and connecting flexible and resilient member 30 to the opposite ejection mechanism side 50 by corresponding anchor pivot 32. Flexible and resilient member 30 is connected to CD holder 26 through the moving end pivot 38 while flexible and resilient member 28 is connected to the CD holder 26 by moving end pivot 36. In this way, flexible and resilient members 28 and 30 are pivotally connected to each other as well as to the CD holder 26 by means of the respective moving end pivots 36 and 38. Though many pivoting arrangements may be known to those skilled in the art, all relevant pivoting arrangements will pivotally connect the ends of flexible and resilient members 28 and 30 together to allow the moving ends 86 and 88 to move while keeping fixed ends 90 and 92 at a relatively stationary point with respect to their respective ejection mechanism sides 50 and 52, the operation of which will be explained hereafter.

The CD holder 26 or other compact disk holding means may be connected to the bi-stable movement assembly at a number of different positions. Here, CD holder 26 is pivotally connected to the pivotally connected moving ends 86 and 88 of the respective flexible and resilient members 31 and 28. Functionally connected as used throughout refers to any form of connection that allows the compact disk holding means to move with the bi-stable movement assembly.

It is preferable that all pivots as explained above be incorporated as part of the manufacturing process in order to reduce cost. It is entirely possible and within the scope of this invention that multiple pieces be connected together by conventional mechanical constructs such as pin joints though this would not be preferred due to the cost in terms of multiple pans and assembly time due to the added complexity.

Also part of the ejection mechanism is the actuating assembly 94 that is used to urge or push the bi-stable movement assembly from the retracted position to the extended position. A means for urging the bi-stable movement assembly is necessary because the disk is completely enclosed within the compact disk case. Otherwise, the compact disk could be grasped and pulled. No corresponding structure is typically necessary, though possible, for urging the bi-stable movement assembly from the extended position to the retracted position since the user will provide such means for urging by pushing the compact disk into the storage case.

The actuating assembly 94 comprises an elongated actuating arm 44 having a slide knob 40 on the top thereof. Spring members 46 and 48 are attached to respective ejection mechanism sides 50 and 52 and return the actuating arm 44 to a point out of contact with flexible and resilient members 28 and 30 when the bi-stable movement assembly is in the retracted position. The slide knob 40 is accessible by a user of the compact disk container through slide knob slot 42 found in the upper housing piece 20. Spring members 48 and 46 allow the actuating am 44 to be moved by using the slide knob 40 but will pull the actuating arm 44 back to its resting position when pressure is no longer exerted by the user on slide knob 40. The operation of the actuating assembly 94 with respect to the bi-stable movement assembly will be explained hereafter in more detail.

The entire ejection mechanism including CD holder 26, and actuating assembly 94, is preferably ejection molded using polypropylene. Polypropylene and other similar materials provide the flexible but resilient qualities required of the bi-stable movement assembly comprised of flexible and resilient members 28 and 30. This quality is also necessary for spring members 46 and 48 that are used to return the actuating arm 44 back to its original position after it is used to urge the bi-stable movement assembly to the extended position in ejecting the compact disk from the case.

Figure 2:
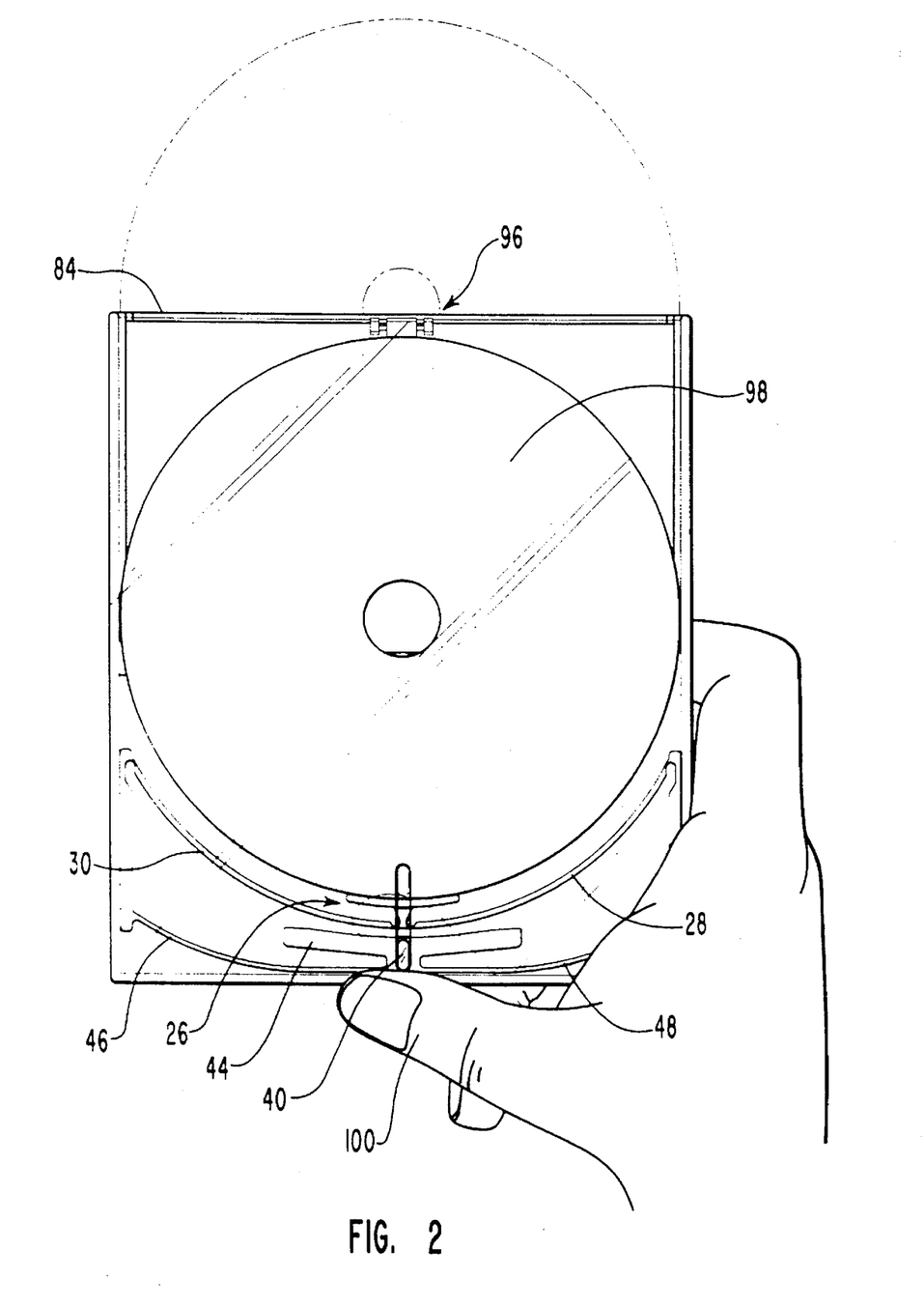
FIG. 2 is the compact disk container of FIG. 1 as operated by a user showing the retracted and extended positions of the compact disk with respect to the case.

FIG. 2 shows the operation of the ejection mechanism by a user holding the assembled compact disk container of FIG. 1. The compact disk 98 is shown initially within the compact disk container and the user's thumb 100 positioned over the slide knob 40 ready to eject the compact disk 98 from within the compact disk storage container. The phantom lines show the position of the thumb having moved the slide knob 40 forward to eject the compact disk 98 to a point where a substantial portion has exited through entrance/exit slot 84 and can be grasped by the user (as shown by the phantom lines). When the user moves the slide knob 40, the actuating arm 44 moves the flexible and resilient members 28 and 30 that make up the bilateral movement assembly to urge them to the extended position to eject the compact disk from the storage container. When the user is finished ejecting the compact disk, the spring members 46 and 48 will return the actuating arm and slide knob 40 back to their original position.

Figure 3A:
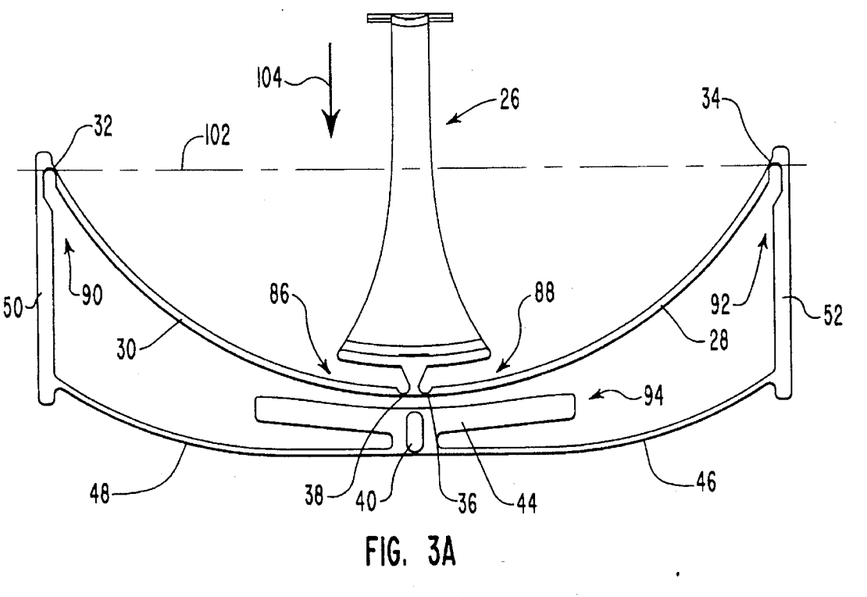
FIG. 3A is a top planar view of the ejection mechanism shown in FIG. 1 having a bi-stable movement assembly in the stable retracted position.
Figure 3B:
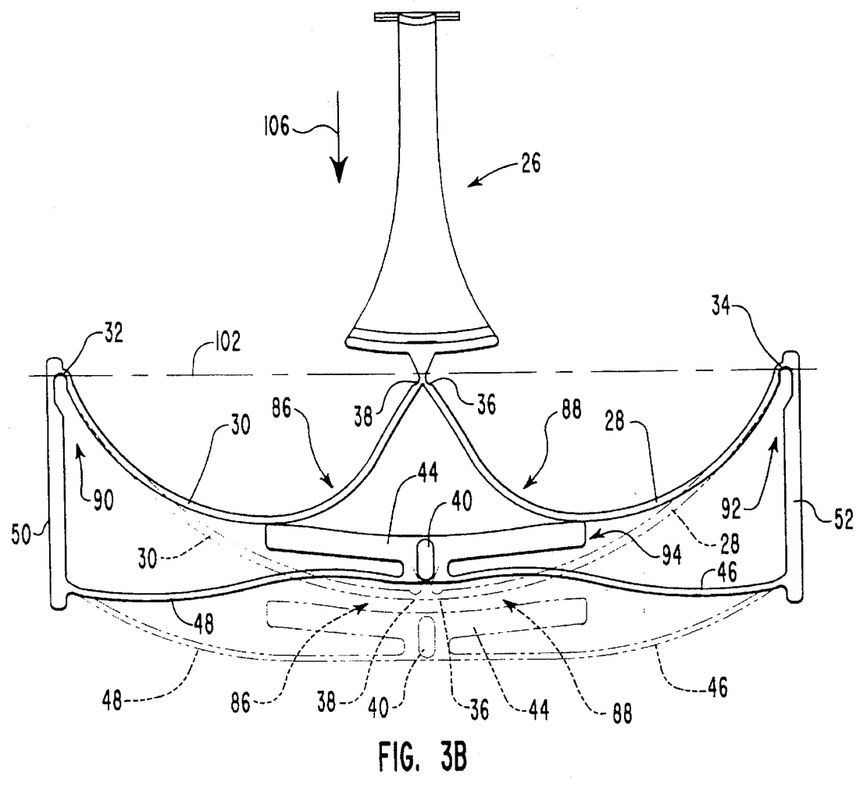
FIG. 3B is a top planar view of the ejection mechanism shown in FIG. 1 having a bi-stable movement assembly being urged by actuating means into the unstable region towards the extended position.
Figure 3C:
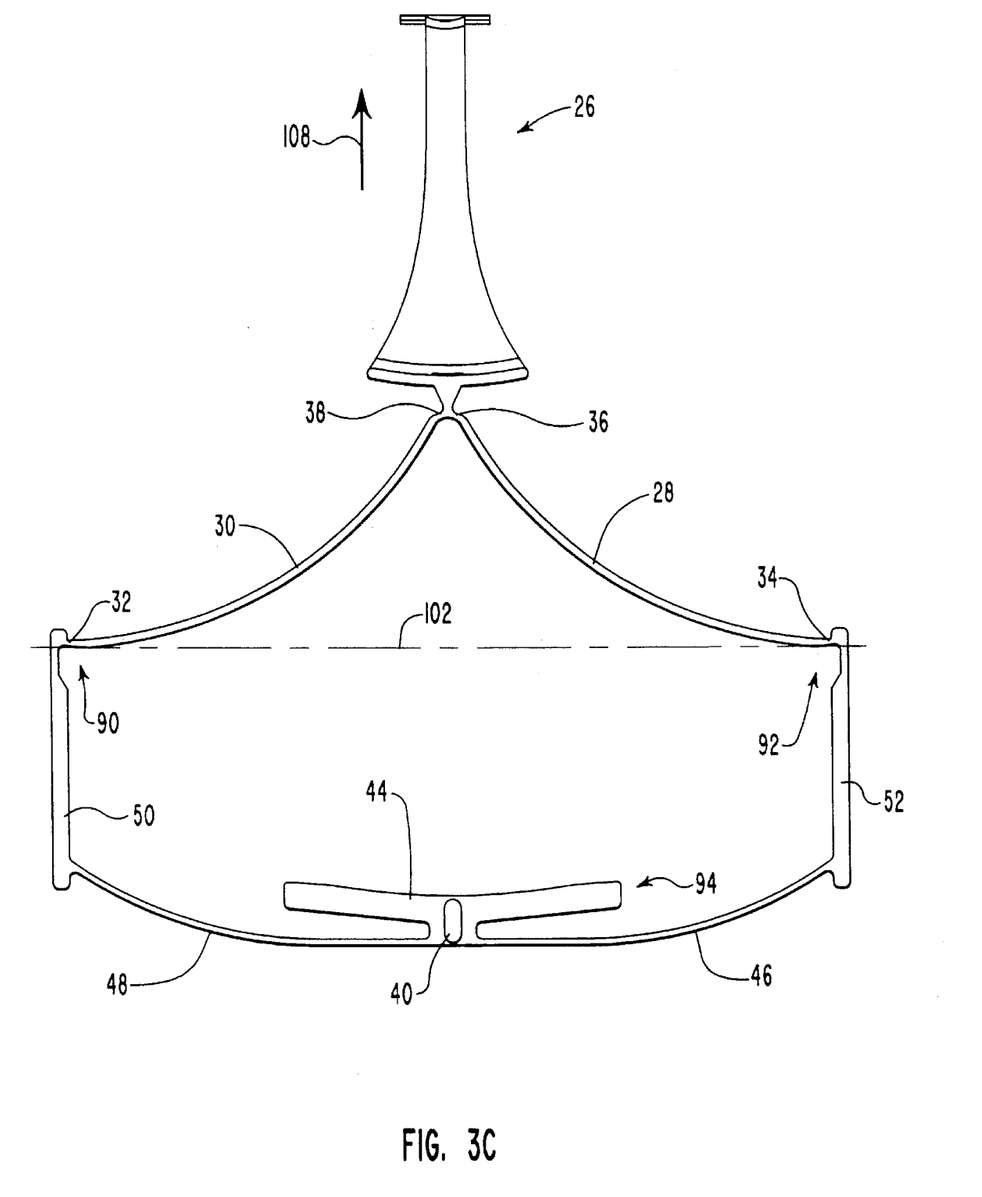
FIG. 3C shows a top planar view of the ejection mechanism shown in FIG. 1 having a bi-stable movement assembly with the movement assembly in the stable extended position.

FIGS. 3A through 3C show the internal operation of the ejection mechanism with 3A showing the bi-stable movement assembly in the retracted position, 3B showing the operation of the actuating assembly to transition the bi-stable movement assembly to the extended position, and 3C showing the bi-stable movement assembly in the extended position. As an actuating means moves the bi-stable movement assembly, a transition point is crossed wherein the assembly automatically continues movement to the extended position.

The transition point 102 is identified in all three Figures as a line to be crossed. This transition point 102 determines which direction the flexible and resilient members 28 and 30 will drive the bi-stable movement assembly and hence the CD holder 26. In the initial position as shown in FIG. 3A, the bi-stable movement assembly is in a stable and natural retracted position. If the bi-stable movement assembly is moved forward from this stable position, forces represented by arrow 104 will tend to drive it back to this natural stable position.

FIG. 3B shows entrance into the unstable region caused by the actuating assembly 94. The unstable region is any region between two stable positions, the stable retracted position represented by FIG. 3A or the stable extended position represented by FIG. 3C. While in the unstable region, forces will drive the bi-stable movement assembly to one of the two aforementioned stable positions. The determination of which stable position the bi-stable movement assembly will be driven is determined by which side of the transition point 102 the moving ends 86 and 88 lie. The preferred embodiment shown herein is designed so that the bi-stable movement assembly will be driven to the stable position closest to the pivotally connected moving ends 86 and 88 of respective flexible and resilient members 28 and 30.

As shown in FIG. 3B, with arrow 106 pointing towards the retracted position, it is clear to see that there will be resistance on the actuating assembly 94 until transition point 102 is crossed. This resistance is overcome by the force of the user's finger operating slide knob 40 and FIG. 3B shows the ejection mechanism at a point just before transition takes place.

FIG. 3B shows the flexing of spring members 46 and 48 as the slide knob 40 is pushed forward causing the actuating arm 44 to push against flexible and resilient members 28 and 30. Once released, spring members 46 and 48 will draw the actuating arm 44 back to its original location as shown by the phantom lines. When the actuating arm first pushes against the flexible and resilient members, initially contact is made near the middle of the actuating arm 44 against the pivotally connected moving ends 86 and 88. As the flexible and resilient members 28 and 30 bend the contact point with the actuating arm 44 tends to move outwardly along actuating arm 44 towards the distal ends and along the flexible and resilient members 28 and 30 as the moving ends 86 and 88 are pushed forward towards the extended position. During this movement into the unstable region, the flexible and resilient members are resisting the movement and storing energy as a result of the movement.

Once the transition point 102 is crossed, the direction to which the bi-stable movement assembly will naturally be driven is immediately changed. This is shown by arrow 108 in FIG. 3C pointing towards the extended position. When the direction is changed, there is no longer any resistance being exhibited by the actuating arm 44 and the energy stored during movement towards the transition point 102 is released to drive the bi-stable movement assembly to the stable extended position as shown in FIG. 3C.

The reverse process occurs when a compact disk is put into the CD holder 26 and pushed into the case. Initially there will be forces resisting the movement into the unstable region tending to keep the bi-stable movement assembly in the extended position but once the transition point 102 is crossed, the stored energy and lack of resistance will draw the compact disk towards the retracted position as shown in FIG. 3A.

Therefore, the same principles apply for retraction of a compact disk as do for ejection of a compact disk. There is no actuating mechanism necessary for retraction other than the force supplied by the user pushing the compact disk into the case that causes the bi-stable movement assembly to enter the unstable region and cross the transition point 102. Other embodiments may incorporate more elaborate mechanisms for compact disk retraction according to application.

It should be noted that the flexible and resilient members 28 and 30, shown in this embodiment as being slightly curved, are only an example of one shape the flexible and resilient members could take. Many different shapes and positions could be chosen with the same net effect of having a bi-stable movement assembly. The members need not be the exact same size nor does the compact disk holder need to be attached at the mid point between the flexible and resilient members 28 and 30 as shown. The illustrated design is, however, preferred since it lends itself for a thin packaged design around the outer edges of a compact disk. Furthermore, the chosen connection point for the CD holder 26 is chosen at the point of the longest potential movement between the two stable positions.

The amount of desired movement for disk shaped media can be easily adjusted by the length of the flexible and resilient members as well as the positioning of the fixed ends 90 and 92. For example, by drawing the fixed ends 90 and 92 closer together while retaining the same length of the flexible and resilient members 28 and 30, the overall length of travel for the bi-stable movement assembly will be increased. Conversely, if the fixed ends 90 and 92 are held further apart, the total travel distance is decreased. Essentially, the bi-stable movement assembly is comprised of the two flexible and resilient members 28 and 30 and their pivotal attachments to one another and to the anchor points that are fixed with respect to some external housing.

Another reason the illustrated semicircular arrangement of the flexible and resilient members 28 and 30 is preferred is to allow for the leveraging of the actuating assembly 94. Because of the operation and contact of the elongated actuating arm 44 with differing points along the flexible and resilient members 28 and 30, a user is able to eject a compact disk by moving the slide knob 40 only one-quarter of the entire movement length. For conventional compact disk media used in music CDs and computer CD-ROMs, this translates to approximately a little over one inch. Such a small amount of travel is highly advantageous since only slight finger or thumb movement is required.

Figure 5:
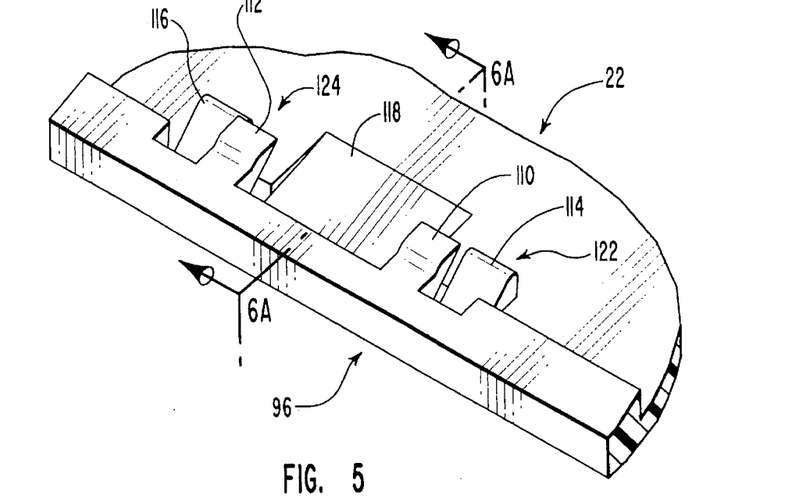
FIG. 5 is a closeup perspective view of the release catch shown in FIG. 1.

Referring now to FIG. 5, the release catch 96 molded onto the lower housing 22 is shown in more detail. The release catch 96 is comprised of upper guiding projections 110 and 112, lower guiding projections 114 and 116, and the recess 118. Upper guiding projection 112 in conjunction with lower guiding projection 116 provides a guiding groove 120 that will guide the release protuberance 70 downward, while upper guide projection 110 and lower guide projection 114 provide guiding groove 122 that corresponds to release protuberance 68. When the distal end release protuberances 68 and 70 are drawn downwards through the corresponding guiding grooves 120 and 122, the distal end 74 of the CD holder 26 is drawn into the recess 118, away from the compact disk 98, at which point the compact disk 98 can be removed freely.

Figure 6A:
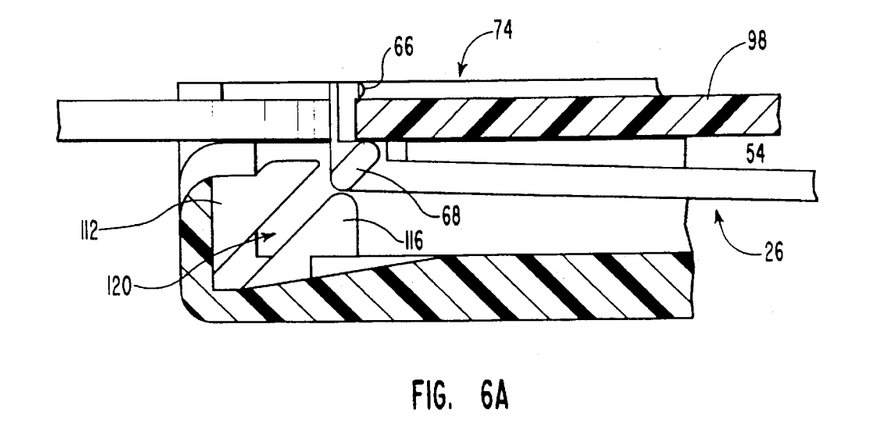
FIG. 6A is a cut-away view of the release catch shown in FIG. 5 showing the CD holder just before it enters the release catch.

FIG. 6A is a cut-away view of the lower housing 22 that illustrates how the release catch 96 operates. FIG. 6A is a snap shot of the CD holder 26 as it is moving through the unstable region towards being in the extended position at a point just before the release protuberances 68 and 70 enter the respective guiding grooves 120 and 122, while FIG. 6B shows the CD holder 26 in the extended position with the distal end 74 being drawn downward into recess 118 to draw the clip 66 away from compact disk 98 thereby allowing the compact disk 98 to be freely removed.

Figure 6B:
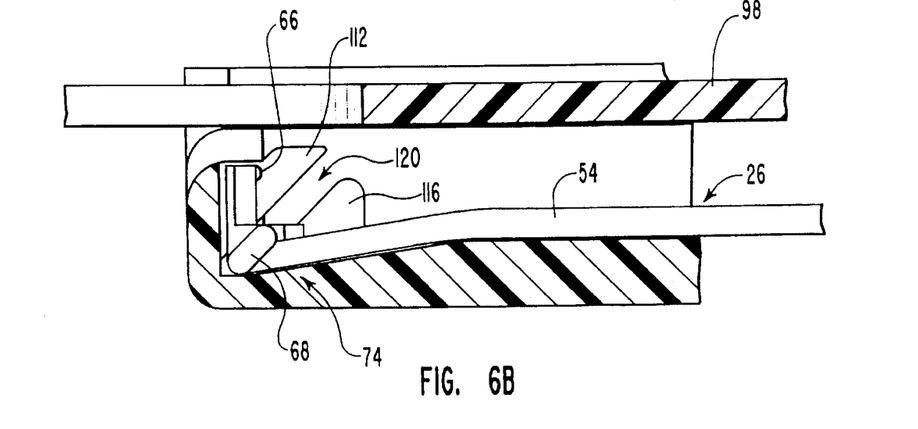
FIG. 6B is a cut-away view of the release catch of FIG. 5 showing the CD holder after it is drawn down and away from the compact disk by the release catch thereby allowing the compact disk to be easily removed.

When the bi-stable movement assembly is in the fully extended position, the CD holder 26 is forced and held into its open position as shown in FIG. 6B. At this point, the compact disk 98 is completely suspended by its edges in the corresponding side channels formed by the upper housing 20 and the lower housing 22 with no other forces acting upon it. In this position, the user simply slides the compact disk out of the case since approximately half the compact disk 98 will be exposed and the compact disk case is ready to receive a compact disk for storage.

With the case empty and the bi-stable movement assembly in the extended position with the CD holder 26 drawn down and away, a compact disk 98 can be easily inserted into the exit/entrance slot of the compact disk case and slid along the side channels until meeting the base end of the CD holder 26. At this point, when the user pushes the compact disk further into the case, the CD holder 26 will move up and out of the recess 118 to the point illustrate by FIG. 6A where the clip 66 will firmly grasp and hold the compact disk 98 within the CD holder 26.

Figure 7:
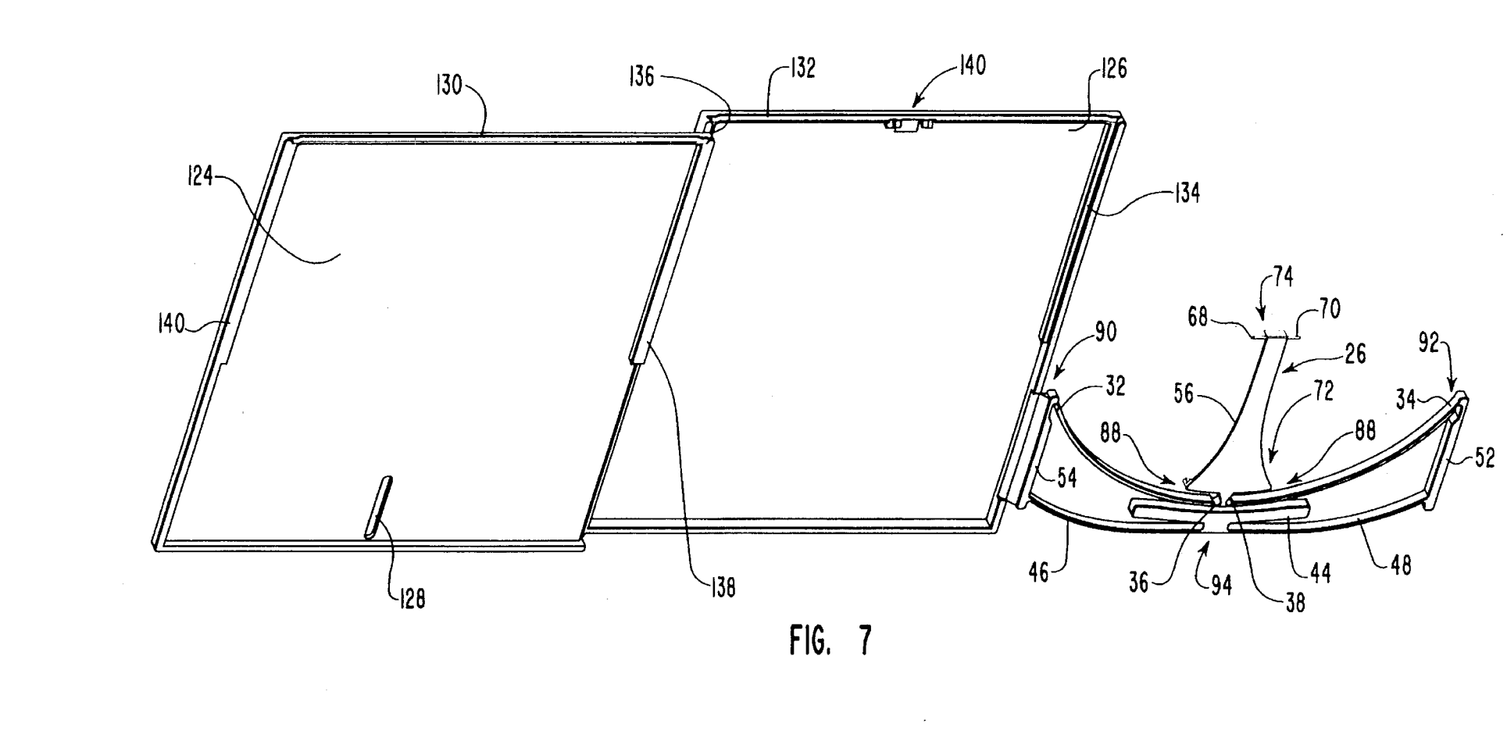
FIG. 7 is an alternative embodiment of a compact disk case that is a single injection molded article of manufacture and having the ejection mechanism shown in FIG. 1.

FIG. 7 shows another embodiment of a compact disk case where the same ejection mechanism assembly as shown in FIG. 4 and explained previously is incorporated into a single injection molded article of manufacture. The entire article of manufacture is made of polypropylene as was the ejection mechanism assembly 94 originally.

The article of manufacture is comprised of the ejection mechanism assembly 94, a first enclosure portion 124, and a second enclosure portion 126 that are combined together with living hinges in order to be folded together to form a compact disk case. Furthermore, the first enclosure portion 124 has a slide knob slot 128, an exit/entrance notch 130, and CD channel bases 140 and 138 integrally molded therein. Likewise, the second enclosure portion has molded therein, CD channel notches 134 and 136, an exit/entrance notch 132, and a release catch 140 that is the same as the release catch explained in the previous embodiment.

When folded together, the exit/entrance notches 130 and 132 will form an exit/entrance slot for introduction of a compact disk. In like manner, the CD channel notches 134 and 136 will combine with the CD channel bases 138 and 140, respectively, to form a CD channel to engage a compact disk by its edges to thereby suspend the media surface from touching any component of the compact disk case formed by folding the article of manufacture shown in FIG. 7.

Many cost and assembly benefits can result from the unitarily molded article of manufacture as illustrated in FIG. 7. First, only one part need be managed, second, assembly is accomplished by simply folding the article, and third, low-cost polypropylene is used throughout.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A disk-shaped media positioning mechanism for positioning a disk-shaped media between a retracted and an extended position with respect to a frame, the disk-shaped media positioning mechanism comprising:

a bi-stable movement assembly comprising first and second flexible and resilient members, each member having a fixed end and a moving end, and each moving end pivotally connected to the other and each fixed end pivotally attached to the frame such that the pivotally connected moving ends may move between the fixed ends to the retracted position and the extended position, each respective position lying on opposite sides of an imaginary line formed between each fixed end; and means for holding the disk-shaped media functionally attached to the bi-stable movement assembly.

2. A bi-stable ejection mechanism for ejecting and retracting disk-shaped media into and out of a housing, the bi-stable ejection mechanism comprising:

a bi-stable movement assembly comprising first and second flexible and resilient members, each member having a fixed end and a moving end, and each moving end pivotally connected to the other and each fixed end pivotally attached to the housing at such position to allow the pivotally connected moving ends to pass therebetween, the bi-stable movement assembly being naturally in either a retracted position or an extended position;

means for holding the disk-shaped media, the holding means pivotally attached to first and second pivotally connected moving ends, whereby the bi-stable movement assembly will move the holding means such that when in the extended position an appreciable amount of the disk-shaped media will be outside of the housing and when in the retracted position no appreciable amount of the disk-shaped media will be outside the housing; and means for urging the bi-stable movement assembly between the retracted and extended positions.

3. An ejection mechanism as recited in claim 2 wherein the means for holding the disk-shaped media comprises a tray wherein the disk-shaped media rests.

4. An ejection mechanism as recited in claim 2 wherein the means for holding the disk-shaped media does not extend outside the housing when the bi-stable movement assembly is in the extended position.

5. An ejection mechanism as recited in claim 2 wherein the means for holding the disk-shaped media comprises a media edge clip for grasping an edge of the disk-shaped media.

6. A ejection mechanism as recited in claim 2 wherein the means for urging the bi-stable movement assembly comprises an actuator arm for moving the bi-stable movement assembly through an unstable region until a transition point is crossed at which point the bi-stable movement assembly automatically moves to the extended position, the actuator arm having a slide knob functionally attached thereto and the housing further having means for making the slide knob available external to the housing.

7. A storage container for disk-shaped media, the media having a bottom surface, a top surface, an outer edge, and a central hole having an inner edge, the storage case comprising:

a container housing, the housing capable of completely enclosing the disk-shaped media and the housing having an entrance/exit opening;

a bi-stable movement assembly comprising first and second flexible and resilient members, each member having a fixed end and a moving end, and each moving end pivotally connected to the other and each fixed end pivotally attached to the housing at a position to allow the pivotally connected moving ends to pass therebetween, the bi-stable movement assembly being naturally in either a retracted position or an extended position;

means for holding the disk-shaped media, the holding means functionally attached to the bi-stable movement assembly, whereby the bi-stable movement assembly will move the holding means such that when the bi-stable movement assembly is in the extended position an appreciable amount of the disk-shaped media will be outside of the housing at the housing entrance/exit opening where the disk-shaped media may be removed from or placed onto the holding means and when in the retracted position the disk-shaped media will be enclosed within the container housing; and means for urging the bi-stable movement assembly from the retracted to the extended position.

8. A storage container as recited in claim 7 further comprising first and second side channels as part of the container housing and situated therein to contact only the opposing outer edges of the disk-shaped media to allow complete suspension of the media top surface and the media bottom surface within the container housing.

9. A storage container as recited in claim 7 further comprising means for holding print media material in the container housing.

10. A storage container as recited in claim 7 wherein the container housing is generally rectangular in shape.

11. A storage container as recited in claim 7 wherein the container housing is generally round in shape.

12. A storage container as recited in claim 7 wherein the means for holding the disk-shaped media does not extend outside the container housing when the bi-stable movement assembly is in the extended position.

13. A storage container as recited in claim 7 wherein the means for holding the disk-shaped media comprises a tray wherein the disk-shaped media rests.

14. A storage container as recited in claim 7 wherein the means for holding the disk-shaped media comprises a media clip that grasps and holds the outer edge of the disk-shaped media.

15. A storage container as recited in claim 7 wherein the means for holding the disk-shaped media comprises a media clip that grasps and holds the outer edge of the disk-shaped media and a guide pin and the container housing further comprises a guide slot wherein the guide pin is placed to direct the travel of the media clip when the bi-stable movement assembly moves between the retracted position and the extended position or moves between the extended position and the retracted position.

16. A storage container as recited in claim 7 wherein the means for holding the disk-shaped media comprises an elongated member spanning between the outer edge and the inner edge of the disk-shaped media, the elongated member having a raised distal end to grasp the inner edge of disk-shaped media and a raised base end to grasp the outer edge of the disk-shaped media.

17. A storage container as recited in claim 7 wherein the means for holding the disk-shaped media comprises:

an elongated member spanning between the outer edge and the inner edge of the disk-shaped media, the elongated member having a raised distal end to grasp the inner edge of disk-shaped media and a raised base end to grasp the outer edge of the disk-shaped media;

an outer edge media protection step on the base end of the elongated member; and an inner edge media protection step on the distal end of the elongated member, the inner and outer edge media protection steps to suspend the bottom media surface above the elongated member.

18. A storage container as recited in claim 7 wherein the means for holding the disk-shaped media comprises:

an elongated member spanning between and outer edge and the inner edge of the disk-shaped media, the elongated member having a raised distal end to grasp the inner edge of disk-shaped media and a raised base end to grasp the outer edge of the disk-shaped media;

an outer edge media retention clip on the base end of the elongated member; and an inner edge media retention clip on the distal end of the elongated member, the inner and outer edge media retention clips to retain the disk-shaped media securely onto the elongated member.

19. A storage container as recited in claim 7 wherein the means for holding the disk-shaped media comprises:

an elongated member spanning between the outer edge and the inner edge of the disk-shaped media, the elongated member having a raised distal end to grasp the inner edge of disk-shaped media and a raised base end to grasp the outer edge of the disk-shaped media;

an outer edge media retention clip on the base end of the elongated member;

an inner edge media retention clip on the distal end of the elongated member, the inner and outer edge media retention clips to retain the disk-shaped media securely onto the elongated member;

an outer edge media protection step on the base end of the elongated member; and an inner edge media protection step on the distal end of the elongated member, the inner and outer edge media protection steps to suspend the bottom media surface above the elongated member.

20. A storage container as recited in claim 7 wherein the means for holding the disk-shaped media comprises an elongated member spanning between and outer edge and the inner edge of the disk-shaped media, the elongated member having:

a raised distal end to grasp the inner edge of disk-shaped media, the distal end having an inner edge media retention clip, a first horizontally extending protuberance, and a second horizontally extending protuberance positioned opposite the first protuberance;

a raised base end to grasp the outer edge of the disk-shaped media, the base end having an outer edge media retention clip, the inner and outer edge media retention clips to retain the disk-shaped media securely onto the elongated member; and the container housing further comprises release guide means to channel the first and second protuberances downward to lower the distal end and pull the release clip away from the disk-shaped media thereby allowing the disk-shaped media to be freely removed from the storage container.

21. A storage container as recited in claim 7 wherein the means for urging the bi-stable movement assembly comprises an actuator arm for moving the bi-stable movement assembly through an unstable region until a transition point is crossed at which point the bi-stable movement assembly automatically moves to the extended position, the actuator arm having a slide knob functionally attached thereto and the container housing further having a slide knob slot to make the slide knob available external to the container housing.

22. A single-piece injection molded article of manufacture for making a container to hold disk-shaped media, the media having a bottom surface, a top surface, an outer edge, and a central hole having an inner edge, the article of manufacture comprising:

a first enclosure portion having an entrance/exit notch;

a second enclosure portion having an entrance/exit notch;

an ejection mechanism assembly portion capable of holding the disk-shaped media; and the first enclosure portion, the second enclosure portion, and the ejection mechanism assembly portion connected to each other by folding hinge means and all portions capable of being folded together to make a container for holding disk-shaped media, the container capable of enclosing disk-shaped media, having an exit/entrance opening for the disk-shaped media, and having means for ejecting disk-shaped media through the exit/entrance opening.

23. An article of manufacture as recited in claim 22 where the first and second enclosure portions are generally rectangular in shape causing the container to be generally rectangular in shape when folded into a container.

24. An article of manufacture as recited in claim 22 where the first and second enclosure portions are generally round in shape causing the container to be generally round in shape when folded into a container.

25. An article of manufacture as recited in claim 22 comprising means for holding print media material in at least one of the first enclosure portion and the second enclosure portion.

26. An article of manufacture as recited in claim 22 wherein the both the first and second enclosure portions have opposing side notches oriented with respect to the exit/entrance notches so that when folded, side channels are formed to engage opposing disk-shaped media outer edges thereby suspending the disk-shaped media top and bottom surfaces from contact with either first or second enclosure portions.

27. An article of manufacture as recited in claim 22 wherein the ejection mechanism assembly portion comprises:

a first flexible and resilient compliant member, having an anchor end and a movement end, the anchor end having an integral pivotal mounting;

a second flexible and resilient compliant member, having an anchor end and a movement end, the anchor end having an integral pivotal mounting and the movement end being integrally and pivotally mounted to the first flexible and resilient member movement end, the first and second movement ends stable in only a retracted position or an extended position;

a means for urging the first and second compliant member movement ends from the retracted position to the extended position; and means for holding the disk-shaped media.

28. An article of manufacture as recited in claim 27 wherein the means for holding the disk-shaped media does not extend outside the exit/entrance slot when the first and second movement ends are in the extended position and the article is folded to form a container.

29. An article of manufacture as recited in claim 27 wherein the means for holding the disk-shaped media comprises a tray wherein the disk-shaped media rests.

30. An article of manufacture as recited in claim 27 wherein the means for holding the disk-shaped media comprises a media clip that grasps and holds the outer edge of the disk-shaped media.

31. A article of manufacture as recited in claim 27 wherein the means for holding the disk-shaped media comprises a media clip that grasps and holds the outer edge of the disk-shaped media and a guide pin and one of the first or second enclosure portions further comprise a guide slot wherein the guide pin is placed to direct the travel of the media clip when the compliant member movement ends move between the retracted position and the extended position or move between the extended position and the retracted position.

32. A article of manufacture as recited in claim 27 wherein the means for holding the disk-shaped media comprises an elongated member spanning between the outer edge and the inner edge of the disk-shaped media, the elongated member having a raised distal end to grasp the inner edge of disk-shaped media and a raised base end to grasp the outer edge of the disk-shaped media.

33. A article of manufacture as recited in claim 27 wherein the means for holding the disk-shaped media comprises:

an elongated member spraining between the outer edge and the inner edge of the disk-shaped media, the elongated member having a raised distal end to grasp the inner edge of disk-shaped media and a raised base end to grasp the outer edge of the disk-shaped media;

an outer edge media protection step on the base end of the elongated member; and an inner edge media protection step on the distal end of the elongated member, the inner and outer edge media protection steps to suspend the bottom media surface above the elongated member.

34. A article of manufacture as recited in claim 27 wherein the means for holding the disk-shaped media comprises:

an elongated member spanning between the outer edge and the inner edge of the disk-shaped media, the elongated member having a raised distal end to grasp the inner edge of disk-shaped media and a raised base end to grasp the outer edge of the disk-shaped media;

an outer edge media retention clip on the base end of the elongated member; and an inner edge media retention clip on the distal end of the elongated member, the inner and outer edge media retention clips to retain the disk-shaped media securely onto the elongated member.

35. A article of manufacture as recited in claim 27 wherein the means for holding the disk-shaped media comprises:

an elongated member spanning between the outer edge and the inner edge of the disk-shaped media, the elongated member having a raised distal end to grasp the inner edge of disk-shaped media and a raised base end to grasp the outer edge of the disk-shaped media;

an outer edge media retention clip on the base end of the elongated member;

an inner edge media retention clip on the distal end of the elongated member, the inner and outer edge media retention clips to retain the disk-shaped media securely onto the elongated member;

an outer edge media protection step on the base end of the elongated member; and an inner edge media protection step on the distal end of the elongated member, the inner and outer edge media protection steps to suspend the bottom media surface above the elongated member.

36. A article of manufacture as recited in claim 27 wherein the means for holding the disk-shaped media comprises an elongated member spanning between and outer edge and the inner edge of the disk-shaped media, the elongated member having:

a raised distal end to grasp the inner edge of disk-shaped media, the distal end having an inner edge media retention clip, a first horizontally extending protuberance, and a second horizontally extending protuberance positioned opposite the first protuberance;

a raised base end to grasp the outer edge of the disk-shaped media, the base end having an outer edge media retention clip, the inner and outer edge media retention clips to retain the disk-shaped media securely onto the elongated member; and the one of the first or second enclosure portions further comprises release guide means to channel the first and second protuberances downward to lower the distal end and pull the release clip away from the disk-shaped media thereby allowing the disk-shaped media to be freely removed from the storage container formed when folded.

37. A article of manufacture as recited in claim 27 wherein the means for urging the bi-stable movement assembly comprises an actuator arm for moving the first and second compliant member movement ends through an unstable region until a transition point is crossed at which point the movement members automatically move to the extended position, the actuator arm having a slide knob functionally attached thereto and one of the first or second enclosure portions further having a slide knob slot to make the slide knob available external to the container formed when folded.

* * * * *